(12) United States Patent
Niles

(10) Patent No.: US 11,945,942 B2
(45) Date of Patent: Apr. 2, 2024

(54) STARCH PELLETS FOR SHEET EXTRUSION AND METHODS FOR FORMING THE PELLETS

(71) Applicant: NewStarch Solutions, LLC, Plymouth, MN (US)

(72) Inventor: Matthew H. Niles, Otsego, MN (US)

(73) Assignee: NewStarch Solutions, LLC, Plymouth, MN (US)

( * ) Notice: Subject to any disclaimer, the term of this patent is extended or adjusted under 35 U.S.C. 154(b) by 526 days.

(21) Appl. No.: 17/150,427

(22) Filed: Jan. 15, 2021

(65) Prior Publication Data

US 2021/0130589 A1    May 6, 2021

Related U.S. Application Data

(62) Division of application No. 16/133,037, filed on Sep. 17, 2018, now Pat. No. 10,920,043.

(60) Provisional application No. 62/560,360, filed on Sep. 19, 2017.

(51) Int. Cl.
| | |
|---|---|
| *C08L 3/02* | (2006.01) |
| *B29C 48/00* | (2019.01) |
| *B29C 48/08* | (2019.01) |
| *B29C 48/40* | (2019.01) |
| *B29C 48/92* | (2019.01) |
| *B65D 81/09* | (2006.01) |
| *B29C 48/345* | (2019.01) |

(52) U.S. Cl.
CPC ............ *C08L 3/02* (2013.01); *B29C 48/0012* (2019.02); *B29C 48/022* (2019.02); *B29C 48/08* (2019.02); *B29C 48/40* (2019.02); *B29C 48/92* (2019.02); *B65D 81/09* (2013.01); *B29C 48/345* (2019.02); *C08J 2303/02* (2013.01)

(58) Field of Classification Search
CPC .... C08L 3/02; C08L 2303/02; B29C 48/0012; B29C 48/022; B29C 48/08; B29C 48/40; B29C 48/92; B65D 81/09
See application file for complete search history.

(56) References Cited

U.S. PATENT DOCUMENTS

| | | |
|---|---|---|
| 4,673,438 A | 6/1987 | Wittwer et al. |
| 5,095,054 A | 3/1992 | Lay et al. |
| 5,308,879 A | 5/1994 | Akamatu et al. |
| 5,413,855 A | 5/1995 | Kolaska et al. |
| 5,589,518 A | 12/1996 | Bastioli et al. |
| 5,766,749 A | 1/1998 | Kakinoki et al. |
| 5,736,586 A | 4/1998 | Bastioli et al. |
| 2007/0004827 A1 | 1/2007 | Franke et al. |
| 2007/0021515 A1 | 1/2007 | Glenn et al. |
| 2009/0324913 A1 | 12/2009 | Bastioli et al. |
| 2013/0065055 A1 | 3/2013 | Bastioli et al. |
| 2015/0011664 A1 | 1/2015 | Wycech |

OTHER PUBLICATIONS

International Search Report and Written Opinion for co-pending international application No. PCT/US2018/51564 dated Feb. 27, 2019 (13 pages).

*Primary Examiner* — Edward J Cain
(74) *Attorney, Agent, or Firm* — Christensen, Fonder, Dardi PLLC; Elizabeth A. Gallo; Peter S. Dardi

(57) ABSTRACT

A processing system for producing starch based expanded products useful as packing material for shipping, packaging and insulating applications. Generally, two processing steps for forming materials are involved. In a first step, dense pellets or granules are formed from starch and a plasticizing agent, such as a plasticizing polymer, for example, polyvinyl alcohol. The starch in the pellets is generally formed, for example with an extruder, into a thermoplastic or thermosetting form for further processing. The pellets generally have an individual density of at least about 70 lbs./cubic foot and a small size for convenient delivery for the second processing step. The second process step is based on the expanding of the material from an extruder with water as the expansion agent in which the dwell time in the extruder is short. The process is designed such that a less expensive single screw extruder is suitable for extruding the expanded material. The starch based pellets are convenient for shipping closer to the end use location.

13 Claims, 3 Drawing Sheets

STARCH PELLETS FOR SHEET EXTRUSION AND METHODS FOR FORMING THE PELLETS

CROSS REFERENCE TO RELATED APPLICATIONS

This application is a divisional of copending U.S. patent application Ser. No. 16/133,037 to Niles, entitled "Sheets of Starch Based Packing Material, Starch Pellets for Sheet Extrusion and Methods for Forming Sheets and Pellets," which claims priority to U.S. provisional patent application 62/560,360 filed Sep. 19, 2017 to Niles, entitled "Sheets of Starch Based Packing Material and Methods for Forming the Sheets," both of which are incorporated herein by reference.

FIELD OF THE INVENTION

The present invention relates to starch based pellets and foamed materials, such as sheet materials formed from the pellets. The invention further relates to processes for preparing starch based pellets and foamed starched based materials.

BACKGROUND OF THE INVENTION

Foamed plastic materials such as expanded polystyrene (tradename Styrofoam) in loose fill (peanut) and sheet form have been used for packaging and insulation for many years. They perform their intended purpose very well but have some concerns associated with them. Specifically, polystyrene based materials generate a large volume of waste to dispose of once they have served their intended purpose, and they consume non-renewable resources. The processes used to manufacture them give off hazardous as well as environmentally harmful gases.

SUMMARY OF THE INVENTION

In a first aspect, the invention pertains to a starch resin pellet comprising from about 55 wt % to about 95 wt % starch. The starch resin pellet can have an individual density of at least about 71 lbs/cubic foot, and the longest dimension across the pellet can be no more than about 2 inches. In some embodiments, the starch resin pellet has from about 15 to about 30 wt % water. In alternative or additional embodiments, the individual density is evaluated at 17 wt % moisture content.

In a further aspect, the invention pertains to a method for making a foam-expanded material, in which the method comprises the step of feeding a collection of starch resin in pellet form into a single screw extruder with sufficient water to act as an expanding agent, in which the starch resin pellets have an individual density of at least about 71 lbs/ft$^3$, and the step of extruding the feed material in a molten state through a die after a dwell time in the extruder barrel of no more than about 2 minutes to form an expanded extrudate having a density of no more than about 5 lbs/cubic foot. The extrusion process to form an expanded starch based product can be used to form a sheet material.

In another aspect, the invention pertains to a method for making pellets for biodegradable foamed materials, in which the method comprises the steps of feeding a feed stock comprising powder starch and a starch plasticizing polymer into the extruder and the step of extruding melted feed stock with a dwell time sufficient to cook the starch to achieve a high density. Generally, the feed stock can comprise at least about 55 wt % powder starch and from 2 wt % to 30 wt % plasticizing polymer. The extrusion step is performed through a die to form pellets having a size with no dimension across the pellet more than about an inch, and having an individual density of at least about 71 lbs/cubic foot.

In some aspects, the invention pertains to a biodegradable foamed sheet material comprising at least about 55 wt % starch, is free of $CO_2$ at a concentration above ambient concentration, and having a bulk density between about 0.5 and about 5.0 lbs/ft$^3$, wherein the starch is not enriched.

DETAILED DESCRIPTION OF THE INVENTION

Figure 1:
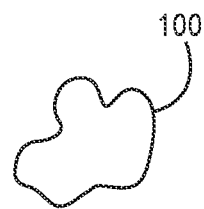
FIG. 1 is a magnified schematic view of a starch pellet.

Processes have been developed to provide for the production of more sustainable expanded packaging materials, such as sheets, using starch based materials, in which the processes can effectively use low cost ingredients and low capital cost equipment that take advantage of dense pellets fed into the system to form an expanded product. In general, the overall process comprises two primary steps. In a first step of the process, powder starch and additives are combined and extruded into relatively dense pellets, which become the feed material for the expanded product, e.g., sheet, formation. Since the pellets are dense, they can be shipped efficiently closer to the point of use where the expanded packaging products are formed. Also, due to the density of the pellets and the fact that the starch generally is already converted to an expandable material, an inexpensive single screw extruder can be used to extrude the final expanded product quickly through a short barrel, generally without any added gaseous expansion agent since water can effectively drive the expansion. The pellet feed materials for expanded product formation can be also formed by extrusion to yield a dense pellet that provides for efficient shipping, while providing the ability to allow for the formation into sheet material or other extruded shapes with a low density and appropriate mechanical strength.

Starch based foamed materials in loose fill form (peanuts) have been available for some time. They are competitive with expanded polystyrene loose fill materials. With the exception of water resistance they perform comparatively with expanded polystyrene. The key advantage of the starch based materials is generally that they are more sustainable emit no harmful or hazardous gases. A general description of starch compositions for forming capsules using extruder to inject material to a mold is described in U.S. Pat. No. 4,673,438 to Wittwer et al., entitled "Polymer Composition for Injection Molding," incorporated herein by reference.

Starch based foamed materials in sheet form have been described. However, to this point in time the sheet form are generally not competitive with expanded polystyrene. Commercial production of starch based expanded sheets have been extruded from high amylose starch in powder form and involves the use of twin screw type extruders. High amylose starch can be expensive, and a high cost can be a significant driving factor in the lack of competitiveness of foam material based on high amylose starch. Also, twin screw extruders can be expensive and involve the use of a skilled operator. In some cases, the extrusion to form starch based sheet materials uses carbon dioxide as an expanding agent. The process described herein can be performed with an inexpensive single screw extruder with water as the expanding agent to form a finished sheet substantially free of carbon dioxide above ambient amounts. The processing herein has succeeded in obtaining stable sheets with low densities. The final extruded product has desirable properties for use as packing material for shipping and packaging applications. The product can also be used for insulation.

The formation of sheet products of expanded starch materials is described in published U.S. patent application 2009/0324913 to Bastioli et al. (hereinafter the '913 application), entitled "Sheet and Product Based on Foamed Shaped Starch," incorporated herein by reference. The formation of the sheet material in the '913 application uses a twin screw extruder with a long dwell time and using carbon dioxide as an expanding agent. In Examples 2 and 10 of the '913 application, granules are formed in a first extrusion from a twin screw extruder with a relatively low water content and these are then fed into a second twin screw extruder at high shear with carbon dioxide as an expansion agent. The examples do not describe the specific properties of the granules, and such an intermediate does not seem to be described in the remaining parts of the description. The examples do note that the water content of the granules was 13.5-14.5%, and the process conditions suggest a lower density relative to the pellets described herein.

The improved processes herein involve two extrusion steps that can be spaced in time as well as location, if desired. The first extrusion step is designed to form dense pellets from input starch, a plasticizing polymer, and optionally other ingredients. To form a well-mixed product at high density, low shear can be used with sufficient dwell time to plasticize the starch. The product of the first extrusion are pellets that can then be used as feed into a second extruder to form the expanded product. In the second extrusion, the density of the pellets of starch provides for rapid extrusion of the expanded product. The starch pellets are in a form with substantially cooked starch and upon heating and shear force the material can be expanded upon exiting the die in the second extrusion step.

Starch is a natural polysaccharide or carbohydrate that comprises primarily from glucose monomers assembled into the polymer. Starch generally includes two types of polysaccharide molecules, a primarily helical amylose molecule and branched amylopectin molecules. Sugar groups in the starch can comprise cations that can be adjusted, and the pH can also be adjusted. Starches are generally of vegetable origin and can be modified using physical (gelatinized or cooked) processes or chemically modified. Starch derivatives are described further in U.S. Pat. No. 5,095,054 to Lay et al., entitled "Polymer Compositions Comprising Destructurized Starch," incorporated herein by reference. Starch as used herein generally refers to natural purified starch as well as modified starch and combinations thereof. Suitable sources for starch include, for example, corn, potatoes, tapioca, wheat, sorghum, pea, other plants and combination thereof. Commercial starches are available from various plant sources and the rough amalose levels for these plant starches are corn starch 25%, high amylose corn starch up to 75%, potato starch 20%, amylose rice starch 2%-20%, amylose tapioca starch 15%-18%, amylose wheat starch 25%, amylose pea starch 35%-70%. Generally, any starch mixture with greater than about 30 wt % amalose can be considered amalose rich, which generally would result in a higher price, and other starch can be referred to as unenriched starch. While in principle the amounts of amylose starch and amalopectin starch can be adjusted across the whole range between mostly amalose starch to mostly amalyopectin starch, various factors influence this selection. For the process that has been performed using the processes herein, similar product properties have been obtained across a range of starch compositions, including those with a low amalose concentration, such as formed with only potato starch.

Natural starch isolated from plants generally is significantly crystalline. Thermoplastic or thermosetting starch can be obtained by the proper treatment of purified plant based starch to transform the crystalline phases to amorphous structures. The cooking of starch structures with water disrupts the crystalline structure with the water acting as a plasticizer to disrupt the interactions within the crystal. More generally, the transformation to a thermoplastic or thermosetting starch can be accomplished with temperature and pressure in the presence of a plasticizer, like water, glycerol, sorbitol and/or other suitable polymers. The plasticizer penetrates into the starch granules and disrupts the initial crystalline structure. With the facilitation provided by heating and shear forces, the material undergoes a melting process and forms a continuous amorphous mass that does not exhibit significant crystalline properties anymore, although complete disruption of the crystal structure may or may not be performed. If the total thermal and mechanical energy provided to the starch is insufficient to melt the material, the product shows unmolten starch granules of clear crystallographic structure. Similarly, an insufficient amount of plasticizer may result in incomplete destruction of the crystallographic structure of such starch (Souza & Andrade, 2002; Van Soest & Knogren, 1997). The starch with a disrupted crystal structure that may be considered thermoplastic or thermosetting under appropriate conditions can be referred to as cooked starch to summarize the various transformations that take place.

In the first process step, input starch powder can be transformed into cooked starch and formed into pellets. In a subsequent process step, starch resin pellets can be fed through an extruder, and a foam material can be extruded. To extrude means to push or to force out. Material is extruded when it is pushed through an opening. The part of the machine containing the opening through which the material is forced is referred to as the extruder die. As material passes through the die, the material acquires a shape based on the die opening. The shape generally changes to some extent as the material exits from the die. The extruded product is referred to as the extrudate. While extruder designs may be specialized for certain applications, commercial extruders are widely used for plastic and food processing generally based on a single screw or two screws within an extruder barrel.

In the overall process, starch starts generally as a powder that is blended with other ingredients and cooked into a dense composite material that is then expanded into a foamed material with a low density and a cell structure, although it is not desired to be limited by the theory of the material behavior. It has been discovered that the processing can be made efficient by dividing the process into two steps in which the first step involves the blending and cooking of the starch into a very dense particulate pellet material. The dense pellets of thermoplastic starch composite can be efficiently shipped near end use locations. The dense pellets can be then expanded very quickly in a low shear single screw extruder with a short barrel that allows for melting of the input material and expansion during the pressure release exiting from the extruder die. Since the input pellets are dense, the second extruder does not need high torque to densify the material prior to expansion. Thus, when producing the final product, the process can be very efficient and fast, with dwell times in the extruder possible less than a minute.

The presently described system allows for the starch based foamed sheet material and other extruded expanded shapes to be manufactured by extruding and/or expanding starch resin pellets. After a first extrusion step, the starch resin is in the form of pellets. As used herein, starch resin refers generally to a starch based extrudable composition. An initial extrusion, or other suitable formation process can be used to form dense starch resin in a pellet form for further processing. The starch resin can be made from starch powder and can comprise additional ingredients as described below. Additionally, twin screw extruders are not required in the manufacture of starch resin pellets or the starch foamed, e.g., sheet, material. Significantly, less expensive and easier to operate single screw extruders can be used for processing in both extrusion steps, in particular for the extrusion to form the expanded product.

Foamed sheets regardless of composition can be relatively expensive to ship since the structure is mostly air. Starch resin can be significantly denser. Less expensive and easier to operate single screw extruders can be strategically located near end use locations to extrude the expanded material close to the final customer. Freight savings can be significant. Thus, the improved processing described herein can effectively provide for efficient distribution process.

The composition of the products described herein with respect to non-volatile components can be referenced relative to the ingredients used to form the products, and water content can be adjusted during processing to achieve desired moisture levels. Generally, the moisture content is adjusted during the processing to achieve the desired products and processing performance. An intermediate is formed as pellets which have a relatively high density with a compressed structure. The pellets are suitable for shipping as well as for effective further expansion and reformation into an integral strong unitary extruded product with a desired shape, such as a sheet. The starch resin pellets with sufficient hydration may have glass transition temperature, for example, from 210° F.-550° F. In any case, the extrusion of the starch can be performed under suitable conditions in an extruder to form expanded products quickly and efficiently from commercial single screw extruders. Following expansion, the material generally behaves as a thermoset polymer. Generally, the starch resin pellets comprise from about 55 wt % to about 95 wt % starch in further embodiments from about 60 wt % to about 93 wt %, and in additional embodiments from about 65 wt % to about 92 wt % starch. These ranges include the natural moisture content of the starch. A person of ordinary skill in the art will recognize that additional ranges of starch content within the explicit ranges above are contemplated and are within the present disclosure. Starches can be derived from various sources, for example, corn, potato, maize, wheat, rice, sorghum, tapioca, pea, and mixtures thereof. Commercial starch comprises some natural moisture content that is generally stable at room temperature. With respect to the pellets, the final moisture level of the pellets is based on an evaluation of the total moisture level regardless of the source. Additional water can be added to the ingredients to adjust the moisture level of the pellets, which can account for some loss, such as a couple percent, through evaporation during processing due to the elevated temperatures. Since starch is hydroscopic further evaporation of water is slow, and the product pellets can be stored and or shipped in plastic bags or the like to inhibit further evaporation, if desired. The combined ingredients for dense pellets generally can comprise from about 10 wt % to about 30 wt % water, in further embodiments from about 11 wt % to about 28 wt %, in other embodiments from about 12 wt % to about 25 wt %, and in additional embodiments from about 13 wt % to about 23 wt % water. A person of ordinary skill in the art will recognize that additional ranges within the explicit ranges above are contemplated and are within the present disclosure.

In addition to the starch, the pellets generally comprise additives, such as, a thermoplastic plasticizing polymer, elastic polymers, emulsifiers, structural polysaccharides, plant fibers, lignins, clay minerals, talc, and other polymers. In particular, the starch pellets generally comprise a polyvinyl alcohol, copolymers thereof, other plasticizing polymers suitable for starch, or a combination thereof. The starch pellets generally comprise from about 2 wt % to about 30 wt %, in further embodiments from about 3 wt % to about 25 wt % and in other embodiments from about 4 wt % to about 22 wt % plasticizing polymers. For expanded starch products, the plasticizing polymers generally used have been polyvinyl alcohol, copolymers thereof, derivatives thereof and mixtures of the foregoing. Polyvinyl alcohol generally is derived from hydrolysis of a polyvinyl ester, and polyvinyl alcohol grades can be specified according to the degree of hydrolysis. For these applications, the polyvinyl alcohol generally has a moderate degree of hydrolysis. Suitable polyvinyl alcohol resins are available, for example, from Kuraray America, Inc. (Kuraray Poval™). Suitable polyvinyl alcohol copolymers include, for example, ethylene vinyl alcohol copolymer, propylene vinyl alcohol copolymer, vinyl acetate-vinyl alcohol copolymers, and the like. The hydroxyl groups of the polyvinyl alcohol can disrupt the crystalline structure of starch to function as a plasticizer for starch. While polyvinyl alcohol itself generally is crystalline, it is soluble in water so that with sufficient water present, the polyvinyl alcohol can plasticize starch. Other polyols, such as glycerin, propylene glycol, or ethylene glycol, can also plasticize starch, and can be included in concentrations from about 0 to 10 wt % and in further embodiments from about 0.5 wt % to 7 wt %. A person of ordinary skill in the art will recognize that additional ranges of plasticizer within the explicit composition ranges above are contemplated and are within the present disclosure.

Furthermore, the pellets can comprise elastomeric or lower melting thermoplastic polymers (from 0 to about 10 wt % and in further embodiments from about 0.5 wt % to 7 wt %), emulsifiers (from 0 to about 10 wt % and in further embodiments from about 0.5 wt % to 5 wt %), structural polysaccharides (from 0 to about 30 wt % and in further embodiments from about 0.5 wt % to 15 wt %), plant fibers (from 0 to about 30 wt % and in further embodiments from about 0.5 wt % to 15 wt %), bark (from 0 to 3 wt % and in further embodiments from 0.25 wt % to 1.5 wt %), lignins (from about 0 to about 5 wt % and in further embodiments from 0.5 wt % to 2 wt %), clay minerals (from 0 to about 5 wt % and in further embodiments from about 0.25 wt % to about 2.5 wt %), talc (from 0 to about 5 wt % and in further embodiments from about 0.25 wt % to 2.5 wt %), and/or other additives from 0 to 5 wt %. A person of ordinary skill in the art will recognize that additional ranges of additive concentrations within the explicit ranges above are contemplated and are within the present disclosure. Suitable elastomeric or lower melting thermoplastic polymers include, for example, polyethylene, polyisoprene, rubber, styrene butadiene copolymer, ECOFLEX (BASF), ethylene vinyl acetate, copolymers thereof, mixtures thereof, and the like. Suitable emulsifiers include, for example, commercial food emulsifiers or one of a large number of commercially available surfactants. Structural polysaccharides include, for example, cellulose, cellulose derivatives, chitosan, chitin, pectin, derivatives thereof, and mixtures thereof. Clay minerals include, for example, kaolin, other aluminum phyllosilicates, and mixtures thereof.

Referring to FIG. 1, starch resin pellets can be irregular shaped granules 100, which can be similar to small crushed rock or gravel. One way to evaluate pellet size for a particular pellet is to consider the longest diameter between two points of the pellet, which generally relates to the size of a cube into which the pellet can fit based on the diagonal between two opposite corners of the cube. The average pellet size can be such that it would fit within a cube ranging in size from about 0.01 inch regular cube to a 2 inch regular cube, in further embodiments from about 0.02 inch to about 1.5 inches, and in additional embodiments from about 0.025 inches to about 1 inch, wherein the cube dimension refers to the length of an edge of the cube. In some specific embodiments, the average pellet size would fit within a regular cube with an edge from about 1/16 inch to about 1/4 inch. A person of ordinary skill in the art will recognize that additional ranges of particle size within the explicit ranges above are contemplated and are within the present disclosure. The upper limit on particle size can be constrained by the size that can reasonably be loaded into an extrusion barrel to extrude the final product.

The starch resin pellets are dense, i.e., not significantly expanded with voids, and the processing to form the pellets is appropriately designed to achieve a high density. The high density of the pellets is consistent with an appropriate amount of cooking and plasticizing of the starch component, in which too little cooking or excessive cooking can result in lowering of the density. The properly plasticized dense pellets are particularly effective in the efficient processing herein to form expanded product. Pellet density can be determined in two different ways, either by the density of each individual pellet or by the density of the pellets in collection of pellets or bulk collection, which is referred to herein as bulk density. The density of an individual pellet is the mass divided by the volume of the pellet. The volume of a pellet, or a collection of pellets to evaluate an average, can be determined by submerging the pellet(s) in a liquid that does not dissolve the pellets. Water can be used to measure the volume of the pellets if the measurement is performed promptly before there is significant dissolving or other significant physical changes of the pellets during the measurement. The density of a collection of pellets is lower due to the space between the pellets occupying volume without any mass. The density of the pellets may be somewhat dependent on the moisture level, which can be adjusted as extruded as well as somewhat after extrusion, such as through heating to remove water or the addition of a suitable amount of water in a sealed environment allowing for the uptake of moisture by the pellets. In some embodiments, to lessen any effects of the moisture level on the pellet density measurement, the density of the pellets can be evaluated at a 17 wt % moisture level with adjustment of the moisture level accordingly. The volume of a collection of pellets can be obtained just by placing the pellets into a measuring vessel. For evaluation of the bulk density, generally at least about 100 pellets are used, and if the pellets are produced using the same process parameters, generally the number of pellets greater than 100 should not alter the bulk density measurement significantly. The pellets may have an individual density of from about 65 lbs/ft3 to about 90 lbs/ft3, in further embodiments from about 70 lbs/ft3 to about 85 lbs/ft3, in other embodiments from about 71 lbs/ft3 to about 84 lbs/ft3 (or at least 71 lbs/ft3), in some embodiments from about 72.5 lbs/ft3 to about 83 lbs/ft3, and in additional embodiments, from about 74 lbs/ft3 to about 82 lbs/ft3. The pellets may have a bulk density from about 38 lbs/ft3 to about 60 lbs/ft3, from about 40 lbs/ft3 to about 57 lbs/ft3, and in further embodiments from about 42 lbs/ft3 to about 55 lbs/ft3. A person of ordinary skill in the art will recognize that additional ranges of pellet density within the explicit ranges above are contemplated and are within the present disclosure.

The desirable pellets described herein can have relatively high moisture content, which can be advantageous for the processing approaches for the expanded products described herein. The moisture content of the starch resin pellets may be, for example, from about 10% to about 30% by weight, in further embodiments from about 12 wt % to about 28 wt % by weight, in other embodiments from about 13 wt % to about 26 wt %, or in additional embodiments from about 14% to about 25% by weight. A person of ordinary skill in the art will recognize that additional ranges of density ratios, moisture contents and glass transition temperatures within the explicit ranges above are contemplated and are within the present disclosure. Moisture content can be evaluated using a heated scale, in which the pellets are heated to drive out the moisture, and the weight change is correspondingly measured.

The expanded products generally are formed from the pellets, optionally with the addition of water or optionally with the addition of further additives. In particular, water can be directly introduced into the extruder barrel to introduce additional water. While additional additives can be added into the material for introduction into the extruder to form the extruded product, it can be desirable to not adjust the composition to a large degree other than the possible addition of water such that a longer extrusion dwell time is not needed to form the expanded product. The moisture content can adjusted through the addition of water to compensate for evaporation from the heated composition during processing and to increase the supply of moisture as an expansion agent. The remaining components of the pellets are generally non-volatile at process temperatures, so their composition is directed carried forward to the expanded product. Of course, the expanded product comprises air and possibly trapped moisture in the cells of the expanded material. In some embodiments, no gases are separately infused to expand the product. Thus, the empty space of the expanded products generally holds air and possibly moisture, and does not have enhancement of carbon dioxide or other inert gases over ambient levels in air since carbon dioxide generally is not used for expansion. In summary, the expanded products comprise the composition of the input pellets with an adjusted moisture level and one or more optional additives at no more than about 5 wt % total and in further embodiments from about 0.5 wt % to about 3 wt % total optional additives, relative to the pellet feed. The optional additives can be mixed with the pellets and added into the extruder barrel with the pellets, and/or the optional additives can be fed into the extruder barrel through a separate input channel. In particular, it can be desirable to add a fine particulate, such as a clay mineral, talc or a combination thereof, to the extruder barrel for the extrusion of the expanded product. The clay mineral/talc can be added additionally or alternatively to the pellet composition. A person of ordinary skill in the art will recognize that additional ranges of additive amounts within the explicit ranges above are contemplated and are within the present disclosure.

The ratio of the density of the starch resin pellet to the expanded starch foam may be adjusted from about 5:1 to about 170:1, in further embodiments from about 10:1 to about 150:1, and in other embodiments from about 80:1 to about 120:1 depending on the process conditions and can be selected within process ranges based upon the end use application. The expanded product generally has a density of no more than about 10 lbs./ft$^3$, in further embodiments no more than about 6 lbs/ft$^3$, and in other embodiments from about 0.5 lbs/ft$^3$ to about 5 lbs/ft$^3$. The density can be adjusted during the final extrusion through the adjustment of the extrusion parameters, such as extrusion speed, temperature, pressure, and moisture level. The moisture level of the extruded sheets may be at or slightly below equilibrium levels since excess moisture evaporates during the expansion process. A person of ordinary skill in the art will recognize that additional ranges within the explicit ranges of density ratios and extruded product density are contemplated and are within the present disclosure.

Figure 2:
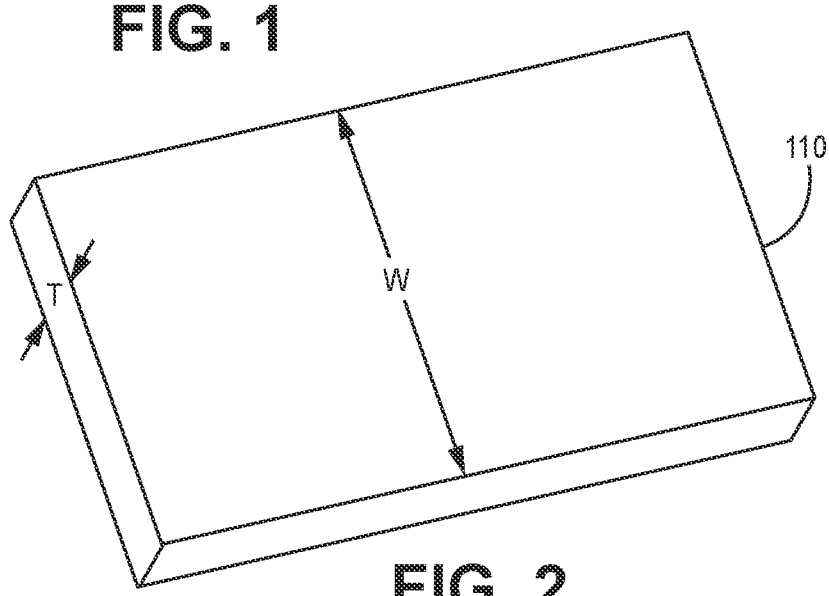
FIG. 2 is a schematic perspective view of an expanded starch sheet.
Figure 3:
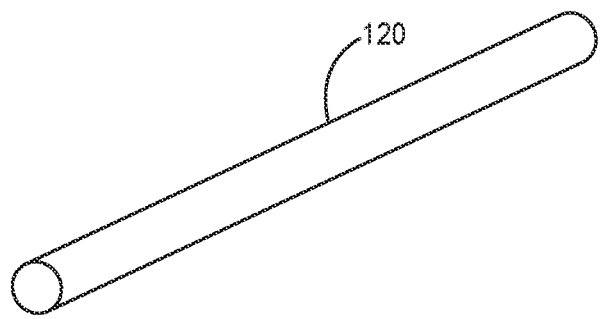
FIG. 3 is a schematic perspective view of an expanded starch rod.

The size and shape of the expanded product are generally only constrained by usefulness of the shape and extrusion die design. A product of particular interest is a sheet 110, as shown schematically in FIG. 2. In some embodiments, a suitable sheet can have a thickness (T) from about ¼ inch to about 6 inches, in further embodiments from about ⅓ inch to about 5 inches, and in other embodiments from about 0.4 inches to about 4 inches, and a width (W) up to roughly 6 feet, in further embodiments from about 3 inches to about 5 feet and in additional embodiments from about 5 inches to about 4 feet, although enlarging extruder barrels can provide for even thicker and wider sheets. The length of the sheet can generally be selected as desired and cut to that length during or following the extrusion process. Other extrudable shapes include, for example, rods 120 (FIG. 3) of selected length with a selected cross section, such as circular, oval, polygonal (such as triangular, rectangular, pentagonal, hexagonal, etc.), S-shaped, star shaped (with a selected number of arms), asymmetric, or the like. A person of ordinary skill in the art will understand that additional ranges of dimensions within the explicit ranges above as well as additional similar shapes are contemplated and are within the present disclosure.

The processing to form expanded foamed products generally involves two extrusion steps. The pellets formed from the first extrusion step can be used for any purpose besides forming expanded products from a second extrusion step. Also, the starch pellets with the described compositions and density may be formed from other suitable processing approach for dense pellets. The expanded products formed from the second extrusion step can be highly desirable for packaging applications as a more sustainable material. The first extrusion step can be designed to produce the dense pellets, such as the use of low shear and cooling of the material exiting the die. The conditions for the second extrusion step are adjusted to provide for the expansion of the product into the highly expanded shapes, such as sheets. Additional processing can be performed following extrusion, such as calendering a sheet to flatten the sheet, cutting the sheet to size, trimming the edges, and the like.

In general, materials can be extruded in the molten state or in the solid state. Polymers are generally extruded in the molten state; however, some applications involve solid state extrusion of polymers. Sometimes the extruder is fed with molten polymer; this is called melt fed extrusion. In melt fed extrusion, the extruder acts purely as a pump, developing the pressure necessary to force the polymer melt through the die. The extruder barrel can be heated to melt or maintain the material in a melt state.

For the extrusion of the starch based materials, the feed is generally solid, and the material is melted to blend the material and to extrude the material through the die. In the first process step to form the pellets, the starch is plasticized as it is melted since starch crystals generally melt at a higher temperature and can decompose prior to melting.

There are two basic types of extruders: continuous and discontinuous or batch type extruders. Continuous extruders are capable of developing a steady, continuous flow of material, whereas batch extruders operate in a cyclic fashion. Continuous extruders utilize a rotating member or screw, which can also be referred to as an auger conveyor, for transport of the material through the barrel of an extruder. Batch extruders generally have a reciprocating member to cause transport of the material. An extruder is usually designated in part by the diameter of the extruder barrel. In the U.S., the standard extruder sizes may be ¾, 1, 1½, 2, 2½, 3½, 4½, 6, 8, 10, 12, 14, 16, 18, 20, and 24 inches.

During basic operation of an extruder, material enters from a feed hopper. Generally, the feed material flows by gravity from the feed hopper down into the extruder barrel. Some materials do not flow easily in dry form and special measures, e.g., mechanical feed components, can be taken to avoid hang-up (bridging) of the material in the feed hopper. As material falls down into the extruder barrel, it is situated in the annular space between the extruder screw and barrel, and is further bounded by the passive and active flanks of the screw flight: the screw channel. The barrel is stationary, and the screw rotates to transport material from the hopper to the barrel end where a die is positioned. As a result, frictional forces act on the material both from the barrel as well as from the screw surface. These frictional forces are responsible for the forward transport of the material.

As the material moves forward, it heats up as a result of frictional heat generation and/or heat conducted from the barrel heaters, if present. When the temperature of the material exceeds the melting point, a melt film forms at the barrel surface. As the material moves forward, the amount of solid material at each location generally reduces as a result of continued melting. It is generally desirable for the material to be completely melted within the barrel, and the polymer melt can be pumped through the die.

As the polymer flows through the die, it adopts the shape of the flow channel of the die. Thus, as the polymer leaves the die, its shape initially corresponds to the cross-sectional shape of the final portion of the die flow channel. Since the die exerts a resistance to flow, a pressure is required to force the material through the die. This is generally referred to as the die head pressure. The die head pressure is determined by the shear applied by the screw, the shape of the die (particularly the flow channel), the temperature, and the viscosity of the melt. For pellet formation, the die head pressure can be selected to form dense pellets, and cooling can be performed on the material exiting the die to reduce or eliminate any expansion after exiting the die. The conditions are set during the extrusion to form pellets to discourage expansion, which allows for the formation of the dense pellets. In contrast, for the formation of the expanded products by extrusion, the release of the pressure of the material exiting the die can result in expansion of the material, and the corresponding conditions are selected to encourage such expansion to form the foamed products.

In general, twin screw extruders or single screw extruders may be used. Extruders may be modified in order to change the properties of the final extrusion. In particular, the second extrusion step to form the final product is generally performed with a single screw extruder, and a single screw extruder can also be used to extrude the dense pellets. A single screw extruder generally involves a lower capital cost and significantly simpler operation, while providing desirable performance for end product formation. Extruder selection for dense pellet formation is generally different from extruder selection for expanded product formation, although it is possible for a single extruder design to provide appropriate processing for both steps.

Figure 4:
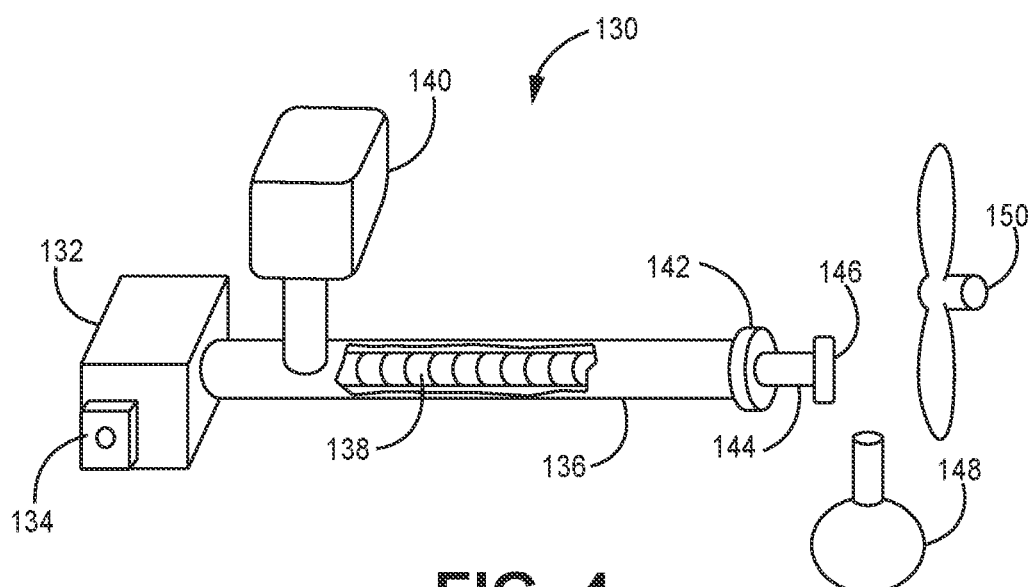
FIG. 4 is a schematic perspective view of a single screw extruder configured for forming starch based dense pellets.

Referring to FIG. 4, a single screw extruder 130 generally comprises drive motor 132, controller 134 connected to drive motor 132, barrel 136, screw 138 housed within barrel 136, feed hopper 140 in fluid connection with barrel 136 for delivery of material into the barrel, breaker plate 142 supporting the end of screw 138, feed tube 144 extending from breaker plate 142 and in fluid connection with barrel 136, and die 146 at the end of feed tube 144. A cooling blower 148 can be configured to blow cooling air or other fluid toward the material exiting die 146, and cutter 150 can be positioned to cut material from die 146 at a selected dimension.

Suitable extruders for forming pellets include, for example, single screw extruders with water/liquid or air cooling, low shear and low RPM (revolutions per minute); and the process conditions provide for the high density of the pellets. Suitable extruders are available from Welex Extruders (Graham Engineering Corporation, Pennsylvania, USA), Sterling extruder (Baker-Perkins North America, Inc.) and Davis-Standard, LLC (Connecticut, USA). The extruders can have a barrel diameter from about ½ inch to about 24 inches. The extruders can be equipped with a powder crammer feeder or the like to feed raw starch and other ingredients into the extruder. The ingredients are passed through a blender prior to placement in the feeder. Added moisture for pellet formation can be added to the ingredients in the blender. For pellet formation, the extruder can have a length to diameter ratio from 12:1 to 50:1. Appropriate zone setting can be selected to adjust the pellet properties.

Figure 5:
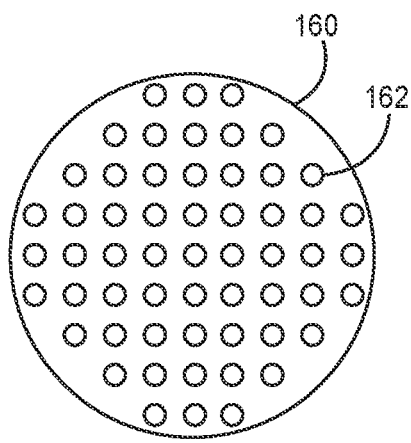
FIG. 5 is a front view of an extruder die configured to make starch pellets.

In general, the die opening may be any suitable size or shape that is selected for the particular product. To form the pellets, the die can comprise a plurality of holes, with diameters corresponding roughly to the pellet diameters. Since the pellet diameters are generally significantly smaller than the extruder barrel diameters, the die can comprise a significant number of holes. Referring to FIG. 5, a representative die 160 is shown with a plurality of holes 162, in which a single representative hole is marked with a reference number to avoid cluttering the figure. FIG. 5 shows circular holes, but other shapes can be used as desired. The number of holes generally is related to the extruder barrel diameter and the power of the extruder. For example, in some exemplified embodiments, a 2.5 inch barrel extruder was used to form pellets with a die having two rings of ⅛ inch holes for a total of 80 holes, or a 3.5 inch barrel extruder used a die with three rings of ⅛ inch holes for a total of 120 holes.

The extrusion processing to form the pellets generally comprises use of low shear and a reasonable dwell time in the extruder barrel to allow for starch processing into a thermoplastic form through cooking of the starch. In some embodiments for pellet extrusion, the extruder is operated at no more than about 128 RPM, in further embodiments from about 10 rpm to about 120 RPM and in some embodiments from 20 to 100 RPM. The dwell time of the material in the extruder barrel from the hopper input to the die generally ranges from about 2 minutes to about 2 hours, in further embodiments from about 3 minutes to about 1 hour, and in other embodiments from about 5 minutes to about 45 minutes. To densify the starch material for the pellets, in some embodiments, the temperature can be set to be higher near the material feed and to be somewhat lower toward the die, and in some extruders different temperature profiles can be used to obtain the higher density pellets. The barrel temperature or extrudate temperature leaving the die can be set to be from about 180° F. to about 400° F. and in further embodiments from about 210° F. to about 360° F. The extruder pressure generally depends on the flow rate, temperature and die dimensions, and for dense pellet formation, the barrel pressure can generally range from about 200 psig to about 2500 psig, in further embodiments from about 500 psig to about 1900 psig, and in further embodiments from about 600 psig to about 1800 psig. A person of ordinary skill in the art will recognize that additional ranges within the explicit ranges above are contemplated and are within the present disclosure. As the material exits the die, cool air can be directed at the material exiting the die to reduce or eliminate any expansion and to maintain a high density for the pellet. A person of ordinary skill in the art will recognize that additional ranges of RPM, dwell times, barrel temperatures and dwell time in the barrel are contemplated and are within the present disclosure. Thus, the pellets have a high density as well as starch that has been plasticized by the heating process and well blended with the additives.

Starch resin pellets can be fed through an extruder, and a foam material can be extruded. The opening in the die is influenced by the desired end product, the available power and torque of the extruder, the diameter of the screw/barrel, the length over the diameter ratio of the screw, the material being processed, the production volume required, and the like. In general, since the starch pellets are dense, the extruder in the final product formation does not need to densify the input material to provide for the expansion of the product. The extruder then can have a relatively short barrel and operate at higher shear and pressures so that the expulsion of the material through the die results in the expansion of the material into the foamed product.

In order to form an extruded starch foam sheet or other expanded product, starch resin pellets are placed in the feeder of a screw extruder. The screw moves the pellet material through the barrel of the extruder. The extruder may be initially heated to start. Thereafter, the friction of the screws, pellets, and extruder melt the pellets. The die may also be heated or cooled to obtain desired results. In some embodiments, suitable single screw extruders for the foamed product can be adapted from commercial food or polymer extruders. Suitable extruders are available from, for example, American Extrusion International (Illinois, USA, e.g., Tiger 20 extruder or Advantage 100 extruder), Maddox Metal Works, Inc. (Texas, USA), Extru-Tech, Inc. (Kansas, USA), Insta Pro International (Iowa, USA). The single screw extruders can have a screw diameter from 2 inches to 12 inches or more, and a length to diameter ratio from 3 to 1 to 16 to 1. A person of ordinary skill in the art will recognize that additional ranges of screw diameters and barrel dimension ratios within the explicit ranges above are contemplated and are within the present disclosure.

Figure 6:
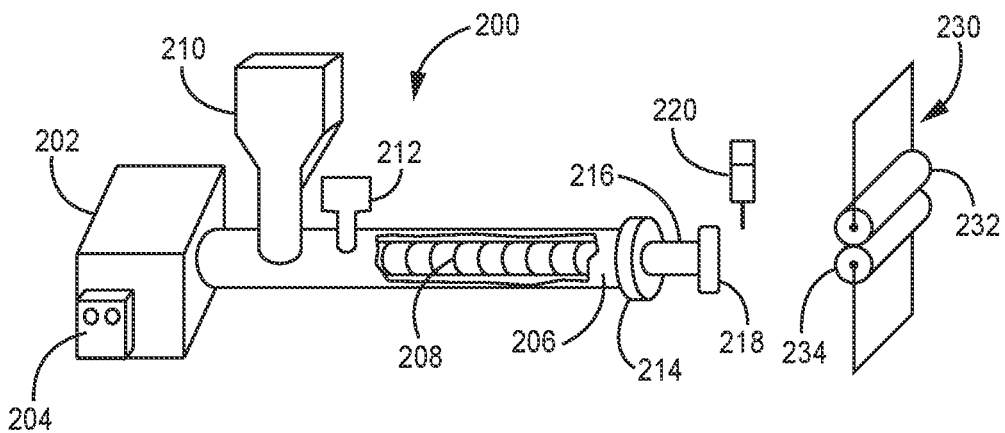
FIG. 6 is a schematic perspective view of a single screw extruder configured for forming expanded foam starch based products shown with an optional calendering component.

The extruders for expanded product formation can be high shear and operate at an RPM from about 100 to about 800 RPM, in other embodiments from about 150 to about 600 and in further embodiments from about 200 to about 550 RPM. The dwell times for the material in the extruder barrel from the hopper input to the die generally is no more than about 2 minutes and can range from about 2 seconds to about 2 minutes, in further embodiments from about 3 seconds to about 1.5 minutes, and in other embodiments from about 4 seconds to about 1 minutes. For forming expanded products, the extruder is initially heated to start, and then the extruder can be operated with no heating or cooling. The material temperature exiting the die generally can be from about 212° F. to about 550° F., in further embodiments from about 230° F. to about 500° F., and in other embodiments form about 250° F. to about 450° F. The extruder pressure generally depends on the flow rate, temperature and die dimensions, and the barrel pressure can generally range from about 400 psig to about 2500 psig, in further embodiments from about 500 psig to about 2200 psig, and in further embodiments from about 600 psig to about 2000 psig. A person of ordinary skill in the art will recognize that additional ranges of RPM, dwell times, barrel pressures, and temperature within the explicit ranges above of process parameters are contemplated and are within the present disclosure. The extruder can be equipped with breaker plates and flow plates to increase shear and stabilize output. A schematic drawing of an extruder for forming the expanded products is shown in FIG. 6. Extruder 200 comprises driver 202, controls 204, barrel 206, screw 208 within barrel 206, feed hopper 210 for supplying pellets, water input 212, breaker plate 214, flow tube 216, die 218 at the end of flow tube 216, and cutter 220. An optional calendering structure 230 with rollers 232, 234 is also shown in FIG. 6.

With the dense melted pellet material input material, the high shear of extruder 200 pushes the pellet melt through die 218 where it rapidly expands when exiting the die. The water in the pellets can function as the expansion fluid to expand the material forming the expanded product, and the pressure differential between the inside and the outside of the barrel facilitate the expansion. In some embodiments, additional water can be added directly into barrel 206 from water input 212 that is configured to provide water directly into the barrel, although water can be added with the pellets in feed hopper 210. In some embodiments, if extra water is added to the pellet feed or separate addition into the barrel, the amount of water delivered into the extruder can be from about 0.25 wt % to about 10 wt %, in further embodiments from about 0.5 wt % to about 9 wt %, and in other embodiments from about 0.75 wt % to about 7 wt % relative to the pellet weight delivered. A person of ordinary skill in the art will recognize that additional ranges of added water within the explicit ranges above are contemplated and are within the present disclosure.

Figure 7:
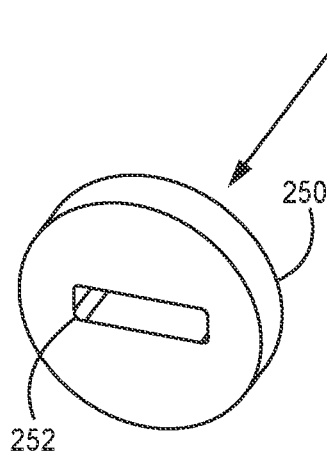
FIG. 7 is a schematic perspective view of a die for the extrusion of a sheet product.
Figure 8:
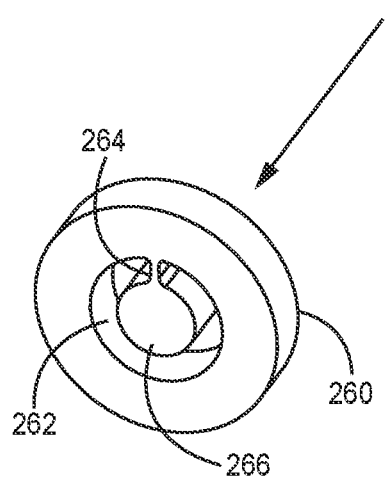
FIG. 8 is a schematic perspective view of a die with an annular opening with a bridge to cut an annular extrudate during the extrusion process.
Figure 9:
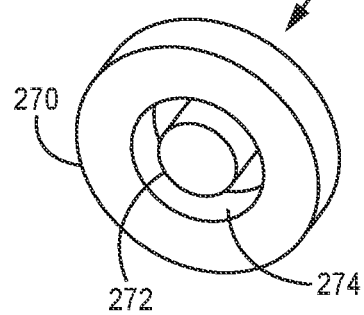
FIG. 9 is a schematic perspective view of die with an annular opening.

The material is extruded through a "gap" in the die. Referring to FIGS. 7-9, three representative dies are shown schematically for sheet formation. The die sketches are not to scale. The gaps of the actual dies are small. Referring to FIG. 7, die 250 has elongated, approximately rectangular, die opening 252 such that a sheet is directly formed by the extrusion. Die 250 can be used to make sheets with widths determined by the die opening which is limited by the barrel size, although the expansion of the sheet material exiting the die provides for an expanded width relative to the die opening. Referring to FIG. 8, die 260 has an annular gap 262 except for a bridging segment 264 connecting core element 266 with the outer wall of annular gap 262. Bridging segment 264 can act to cut the annular extrudate so that the extrudate can be readily unrolled to form a sheet. In such an embodiment, the circumference of the annulus correlates with the width of the product sheet after adjusting for the expansion of the material. In the case of the die opening 262 in FIG. 8, the melt is fed through the die and expanded, and the circular tube form is directly slit. To form a sheet, the slit tube form is unfolded and flattened and cut to length. In general, the gap distance in the annulus of FIG. 8 is from 0.1% to about 4%, in further embodiments from about 0.15% to 3.5%, and in other embodiments from about 0.2% to about 3% of the diameter of core element 266. Referring to FIG. 9, a die 270 comprises a core element 272 and an annular gap 274. Die 270 is similar to die 260 except for the lack of bridging segment 264, and the core element is supported by a backing or flow plate. The difference between the ID and the OD annular gap 274 is 2 times the gap range, which in some embodiments is between 0.005 and 0.50 inches, in further embodiments from about 0.01 to about 0.4 inches, and in other embodiments from about 0.02 to about 0.3 inches. In other words the openings have a very small cross section through which the material is extruded. In exemplified embodiments, a die with an annular outer diameter of 1.493 inches and a pin diameter of 1.453 inches, giving a gap of 0.020 inches, was used to form a sheet that is 10 inches wide and 0.150 inches thick which is wavy after unfolding without calendering. A person of ordinary skill in the art will recognize that additional ranges of gap distance within the explicit ranges above are contemplated and are in the present disclosure.

Figure 10:
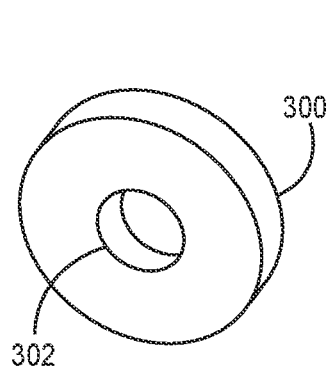
FIG. 10 is a schematic perspective view of a die with a circular opening.
Figure 11:
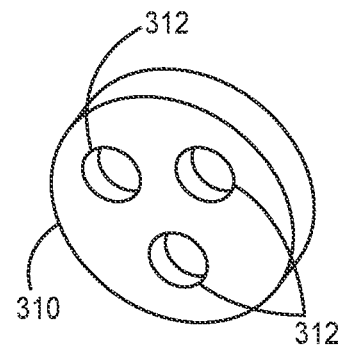
FIG. 11 is a schematic perspective view of a die with a plurality of circular openings.
Figure 12:
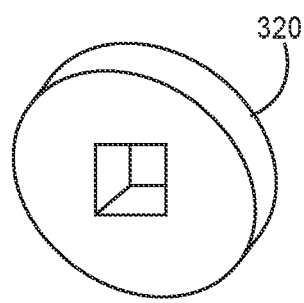
FIG. 12 is a schematic perspective view of a die with a square opening.

Referring to FIG. 10, a die 300 has a circular opening 302 for formation of a cylindrical expanded rod. The diameter of circular opening can be selected to provide a product with a desired size. To take advantage of the production abilities of an extruder for providing smaller rod shaped product, a die 310 in FIG. 11 can provide a plurality of openings 312 to simultaneously produce multiple rods simultaneously. Since the material is expanding as it exits the die, multiple openings should be appropriately spaced apart, and a suitable number can depend on the barrel size and extruder power. As shown in FIG. 11, three openings are shown through die 310, but a different number may be suitable depending on product size and diameter of the die, such as two openings, 2 openings, 4 openings, 5, openings, 6 openings, 7, openings, 8 openings, 9 openings, 10 openings or more than 10 openings. A die 320 for forming rods with a square cross section is shown in FIG. 12. Again, the size of square opening can be selected based on the product size desired, and if appropriate based on the product size, barrel size, and extruder power and other parameters, the die can have multiple square openings. Other opening shapes can also be appropriate, such as oval, semicircular, rectangular, S-shaped, wavy or the like.

The material expands upon exiting the extruder barrel through the die, but accounting for this expansion the die size and shape and processing parameters determine the product shape. A person of ordinary skill in the art can empirically adjust the die size and shape once the desirable processing parameters are fixed to obtain a selected product size. To form a sheet with the curved die, the extrudate is flattened following extrusion. The flattening can be performed with calendering rollers, in which the roller gap can be adjusted to apply an appropriate amount of force. The calendering force can be a function of the temperature and moisture as the material cools and dries after exiting the extruder die. The cooling and drying can be accelerated, for example with blowers or the like, or allowed to occur by natural interaction with the ambient atmosphere. The sheets can be cut to size and trimmed, such as along the edges, which generally are rough as extruded. The sheets can be glued together with water or other aqueous solution. Desired ranges of product shapes and sizes are summarized above. Post processing to achieve a desired shape can provide some modification, e.g., increase, of the density relative to the extruded density after exiting the extruder.

Additional Inventive Concepts - A first additional inventive concepts is directed to a biodegradable foamed sheet material comprising at least about 55 wt % starch, is free of $CO_2$ at a concentration above ambient concentration, and having a bulk density between about 0.5 and about 5.0 lbs/ft$^3$, wherein the starch is not enriched. A further additional inventive concept is directed to a starch resin pellet comprising from about 55 wt % to about 95 wt % starch, wherein the starch resin pellet has an individual density of at least about 71 lbs/cubic foot evaluated at 17 wt % moisture content, and the longest dimension across the pellet being no more than about 2 inches.

The embodiments above are intended to be illustrative and not limiting. Additional embodiments are within the claims and inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A starch resin pellet comprising from about 55 wt % to about 95 wt % starch, wherein the starch resin pellet has an individual density of at least about 71 lbs/cubic foot, and the longest dimension across the pellet being no more than about 2 inches.

2. The starch resin pellet of claim 1 wherein the starch is derived from corn, potato, maize, wheat, rice, sorghum, tapioca, pea, or a combination thereof.

3. The starch resin pellet of claim 1 comprising between about 15% and about 30% moisture.

4. The starch resin pellet of claim 1 wherein the starch resin pellets have an individual density of between about 72.5 lbs/cubic foot and about 83 lbs/cubic foot.

5. The starch resin pellet of claim 1 further comprising polyvinyl alcohol.

6. The starch resin pellet of claim 5 having a polyvinyl alcohol content from about 2 wt % to about 30 wt % and from about 65 wt % to about 92 wt % starch.

7. The starch resin pellet of claim 6 further comprising a clay mineral, talc or a combination thereof.

8. The starch resin pellet of claim 1 further comprising from about 0.5 wt % to about 10 wt % of an elastomer, a thermoplastic polymer or a combination thereof.

9. The starch resin pellet of claim 1 wherein the pellet can fit within a cube having an edge between 1/16 inch and 1/4 inch.

10. A method for making pellets for biodegradable foamed materials, the method comprising:
    feeding a feed stock comprising powder starch and a starch plasticizing polymer into an extruder, wherein the feed stock comprises at least 55 wt % powder starch and from 2 wt % to 30 wt % plasticizing polymer; and
    extruding melted feed stock with a dwell time sufficient to cook the starch to achieve a high density through a die to form pellets having a size with no dimension across the pellet more than about an inch, and having an individual density of at least about 71 lbs/cubic foot.

11. The method of claim 10 wherein the extruder is a single screw extruder, wherein the die comprises a plurality of holes, and wherein the moisture level of the feedstock provides for forming an extrudate with a moisture content from about 15 wt % to about 30 wt %.

12. The method of claim 10 wherein the feed stock comprises:
    at least about 60 wt % starch;
    from about 15 wt % to 30 wt % water;
    from about 2 wt % to about 30 wt % polyvinyl alcohol, co-polymers thereof, derivatives of the foregoing, or a combination of the foregoing.

13. The method of claim 10 wherein the screw RPM is from about 10 to about 200, the dwell time is from about 2 minutes to about an hour, the barrel pressure is from about 200 psig to about 2500 psig, and the extrudate temperature is from about 180° F. to about 400° F.

* * * * *